W. T. HENSLEY.
COMMUTATOR.
APPLICATION FILED OCT. 15, 1914.
1,287,309.   Patented Dec. 10, 1918.
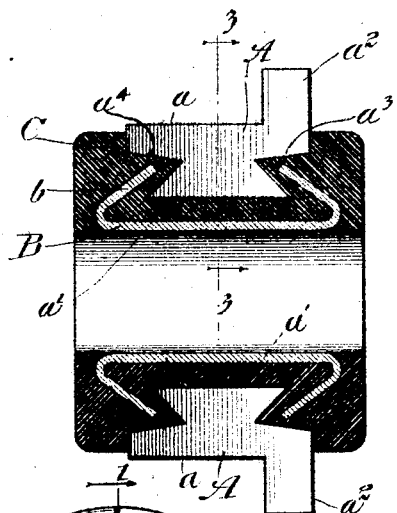
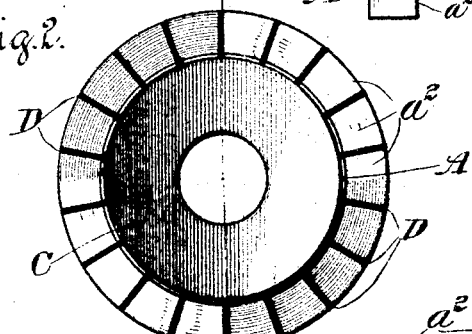
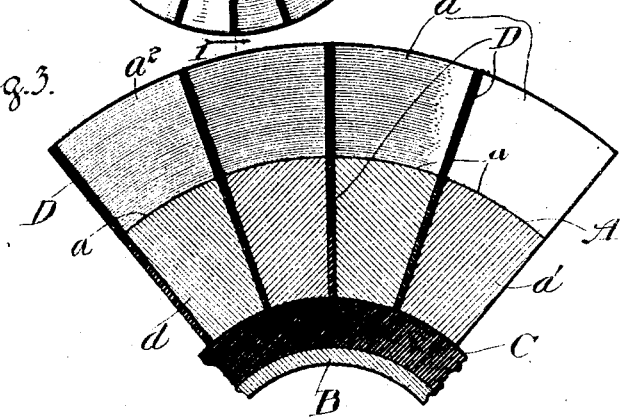
Witnesses   Inventor
  William T. Hensley
  By Arthur F. Durand
    Atty.

UNITED STATES PATENT OFFICE.

WILLIAM T. HENSLEY, OF INDIANAPOLIS, INDIANA, ASSIGNOR, BY MESNE ASSIGNMENTS, TO BOUND BROOK ENGINE & MFG. CO., A CORPORATION OF DELAWARE.

COMMUTATOR.

1,287,309.  Specification of Letters Patent.  Patented Dec. 10, 1918.

Application filed October 15, 1914. Serial No. 866,737.

*To all whom it may concern:*

Be it known that I, WILLIAM T. HENSLEY, a citizen of the United States of America, and a resident of the city of Indianapolis, county of Marion, and State of Indiana, have invented a certain new and useful Improvement in Commutators, of which the following is a specification.

My invention relates to commutators for dynamo electric machines.

An object of my invention is to provide a novel and improved construction and arrangement whereby the commutator bars are more satisfactorily and effectively held in place than heretofore.

It is also an object to provide certain details and features of construction tending to increase the general efficiency and serviceability of a commutator of this particular character.

To these and other useful ends my invention consists in matters hereinafter set forth and claimed.

In the accompanying drawings:

Figure 1 is a longitudinal section on the line 1—1 in Fig. 2 of a commutator embodying the principles of my invention;

Fig. 2 is an end elevation of the said commutator;

Fig. 3 is an enlarged section on line 3—3 in Fig. 1.

As thus illustrated, my invention comprises an annular series of commutator bars A having the shape shown in Fig. 1, each bar being provided with a deep recess having a straight outer edge $a$, angular recesses at the ends providing an inner dove-tail shaped portion $a^1$, and an outer radial segmental projecting portion $a^2$, being made of brass or any other suitable metal. The steel or brass tube B has its end portions bent backward toward each other to form the inclined flanges $b$, and an annular channel of dovetail shape in cross section, it being observed that these flanges project into the angular recesses formed at each side of the dove-tail shaped portions $a^1$ of the commutator bars. These flanges $b$ are spaced from and do not engage the walls of the angular recesses of the commutator bars, but to the contrary the insulation C is interposed between the bars and said flanges, and between the bars and the straight body portion of the said tube, whereby the said bars are entirely insulated from the said steel or brass tube. It will be understood that thin layers of mica D are interposed between the commutator bars, each sheet of mica having the same shape as the commutator bars in side elevation.

The tube B serves as the means for securing the commutator to the shaft of the dynamo electric machine, and the flanges $b$ prevent the bursting of the commutator when subjected to high speed rotation. Furthermore, this construction serves to hold the insulation C in place when the commutator becomes heated, and therefore expanded to some extent. The insulation C may be of any suitable character, such as "condensite" or "bakelite" or other similar material. Moreover, when the commutator is forced onto the shaft, there is then no strain on the said insulation which will tend to rupture it radially. It is not necessary to finish the commutator bars by turning or boring, inasmuch as the rough punched bars with the mica sheets of the same size and shape can be assembled together in cylindrical shape. The rough edges of the commutator bars, formed by punching these bars from sheet metal, will serve to assist in holding the "condensite" or other insulation in firm contact with the bars.

Any suitable method can be employed for combining the parts in the manner shown. For example, the ends of the tube B can be forced into the recesses of the commutator bars in the manner shown, after the bars are assembled in proper position with the sheets of mica between them. Then the "condensite" or other insulation can be molded in and around the different parts in the manner shown, and by any suitable means.

The tubular member B has its flanges $b$ so formed that the annular channel between them is of dove-tail shape, the said channel being restricted at a point between the outer edges of said flanges. The attaching portions $a^1$ of the metal commutator bars A are of similar shape, but not necessarily of the same angle as the sides of the dove-tail channel in the said metal member. Thus the metal bars are practically dove-tailed into the annular metal member B, but with sufficient looseness or clearance between them to permit of the introduction of the insulation in the manner explained. Obviously, however, the metal commutator bars A are not removable except by some distortion of the member B, as to do this the flanges $b$ must be sprung or bent away from each other.

It will be seen that the insulation C extends not only inside of the channel formed between the flanges $b$, but also along the outer surfaces of these flanges and toward the center to such an extent that certain portions of the insulation are flush with the inner surface of the tubular member B, in the manner illustrated. It will be understood that any suitable means can be employed for securing the commutator upon the shaft. For example, the diameter of the shaft can be such that the commutator will not slide readily thereon, but will require some considerable force and pressure to accomplish this, whereby the member B will be expanded slightly and thus held tightly on the shaft by the constant tendency of the metal to contract or assume its original condition. Such method of securing the commutator on the shaft does not, by reason of the construction employed, tend in any way to break or injure the commutator.

As illustrated, the commutator bars A, are of such shape that each bar has V-shaped notches or recesses at opposite ends thereof. The flanges $b$ are shown extending into these V-shaped notches or recesses, but do not engage the bars. Also, as shown, the lower edges $a^3$ and $a^4$ of the bars, which are the upper edges of said V-shaped notches or recesses, are not horizontal but to the contrary are tilted slightly and converge downwardly toward each other. It is obvious, however, that the formation of the bars can be of any suitable character, and that the shape of the tubular member B can be changed or varied if desired, without departing from the spirit of my invention.

The insulation C is in the form of a solid molded mass having the shape of a short cylinder having thick walls in which are solidly embedded portions of the bars A and member B in the manner shown and described. With this method the insulation adheres to the member B and bars A.

What I claim as my invention is:

A commutator comprising an annular series of bars; each bar being formed with a dovetail shaped inner part providing angular end recesses and outwardly inclined outer edges and a deep recess at the outer part providing an outer radial segmental projecting portion at one end of the bar, an annular series of thin mica layers of similar shape to the bars alternating with and located between the bars, a metal tube having its end portions bent backward and toward each other to form inclined flanges providing an annular channel of dovetail shape in cross section, receiving the inner dovetail shaped parts of the annular series of bars and layers; the curved ends of the tube entering the end recesses and spaced from and embracing the dovetail parts, and a body of insulation in which the inner parts of the series of bars and layers and the ends of the tube are embedded.

Signed by me at Bound Brook, New Jersey, this 29th day of September, 1914.

WILLIAM T. HENSLEY.

Witnesses:
FLORENCE A. HOSKING,
JOHN R. TINGLEY.

Copies of this patent may be obtained for five cents each, by addressing the "Commissioner of Patents, Washington, D. C."